Dec. 31, 1929.  N. R. FRENCH  1,741,926
COMPOUND LOADING SYSTEM
Filed Nov. 12, 1925    2 Sheets-Sheet 1
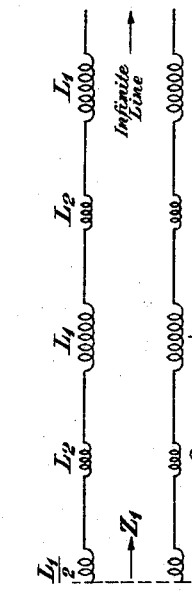
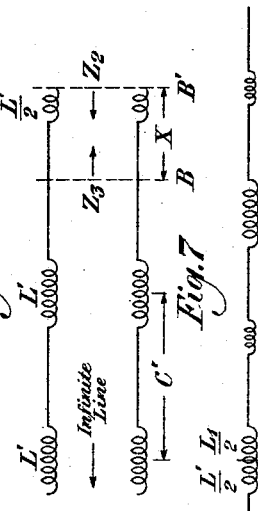
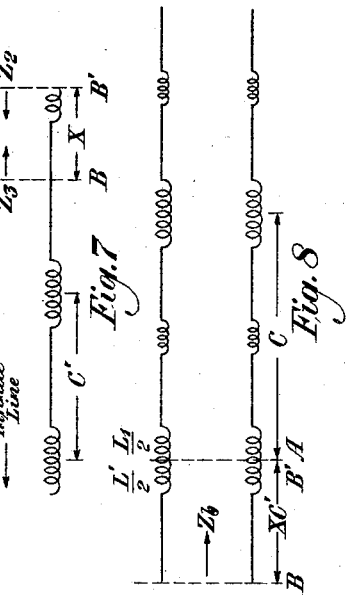
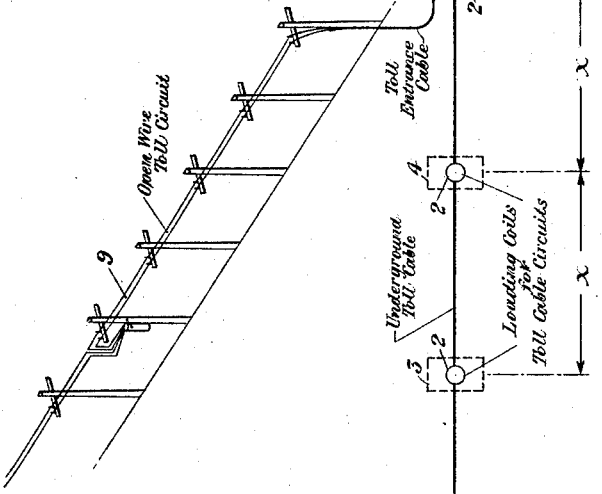
INVENTOR
N. R. French
BY
ATTORNEY Dec. 31, 1929.  N. R. FRENCH  1,741,926
COMPOUND LOADING SYSTEM
Filed Nov. 12, 1925  2 Sheets-Sheet 2
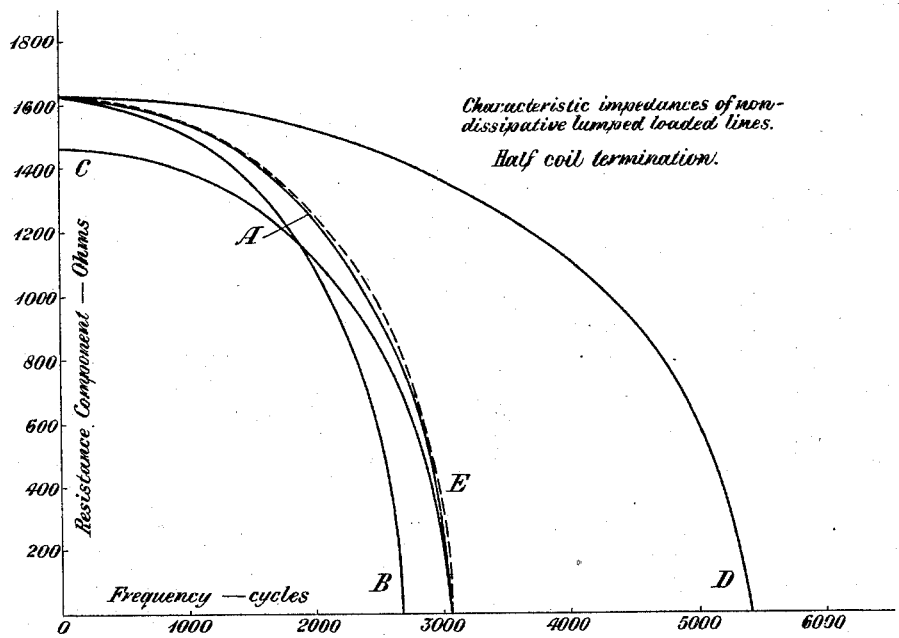
*Fig. 4*
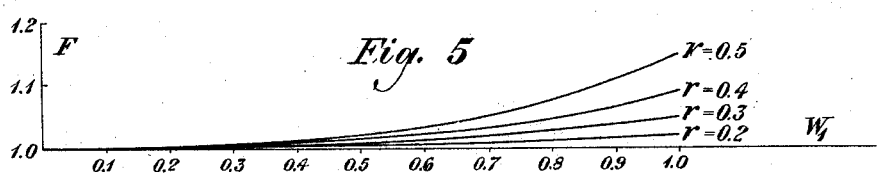
*Fig. 5*
KEY
- ① Terminal Loading Coil
- ⊗ Large Inductance Loading Coil
- ○ Small  "  "  "
- □ Intermediate Ind.  "  "
- ---- Large Capacity Section
- +++++ Small  "  "
- ——— Intermediate  "  "
*Fig. 9*
*Fig. 10*
INVENTOR
*N. R. French*
BY
ATTORNEY Patented Dec. 31, 1929

1,741,926

UNITED STATES PATENT OFFICE

NORMAN R. FRENCH, OF BROOKLYN, NEW YORK, ASSIGNOR TO AMERICAN TELEPHONE AND TELEGRAPH COMPANY, A CORPORATION OF NEW YORK

COMPOUND LOADING SYSTEM

Application filed November 12, 1925. Serial No. 68,692.

This invention relates to loading systems, and particularly to a compound system of lumped loading in which loading coils of two different inductance values are located at alternate loading points upon a circuit.

In cables connecting with loaded open-wire systems, it is desirable to obtain, at frequencies below the cut-off of the loading, a characteristic impedance equal to that of the open-wire line, for the purpose of eliminating the impedance irregularity which would occur otherwise at the junction of the cable and the open wire. The equality of characteristic impedance requires that the nominal impedance and critical frequency ot the loaded entrance cable circuit equal that of the loaded open wire. Loading of open-wire lines is at present restricted to a 7.88-mile spacing (or multiple thereof) as a result of the transposition systems in use. With such open-wire spacing, a spacing of approximately 5,200 feet with the standard type of loading coils is required in entrance cables having a capacity of .062 mf. per mile, in order to obtain a nominal impedance and critical frequency equal to that of the loaded open wires.

For the purpose of this discussion standard loading (also referred to as ordinary or simple loading) is considered as that type of loading in which all of the loading coils have the same inductance and are spaced at equal intervals.

It is, however, very desirable in entrance cable circuits to use a spacing of 3,000, 6,000 or 12,000 feet in order to fit in with the standard 6,000-foot spacing of loading coils connected with toll cable loaded circuits, namely, circuits entirely within cables which may be routed through the same conduit or cable. This follows as a result of the savings obtained by the decreased number of loading vaults and fixtures required and the decreased cost resulting from a simplification of the capacity unbalance testing and cable splicing.

One of the objects of this invention is to render it possible to load a toll entrance cable so that the spacing of the coils thereon will fit in with the standard spacing of existing toll cable circuits, and at the same time to obtain circuits having a characteristic impedance equal to that of the loaded open-wire circuits with which the toll entrance cable circuits are to be connected.

Other objects of this invention will be apparent from the following description when read in connection with the attached drawing, of which Figure 1 illustrates an open-wire circuit connected with a toll entrance cable within the same conduit system in which an existing loaded toll cable is placed, the purpose of this figure being to illustrate the need for the present invention; Figs. 2 and 3 illustrate schematically systems of compound loading in which this invention resides; Figs. 4 and 5 are curves descriptive of the invention; Figs. 6, 7 and 8 show the manner in which compound loading may be used in connection with a simple loaded circuit in which the end section has been terminated by something other than a half coil; and Figs. 9 and 10 show schematically two other forms of compound loading which have generally similar impedance characteristics to the particular type exemplified by Figs. 2 and 3.

Fig. 1 shows underground toll cable 1 which is uniformly loaded by means of the coils 2, each having the same inductance and spaced apart by equal distances represented by $x$. The dotted rectangles indicated by 3 to 8, inclusive, represent manholes along the lines of the conduit through which the underground cable extends. The loading coils which are encased in pots are located within the manholes 3 to 8, inclusive, which are separated by the spacing $x$. An open-wire toll circuit 9, which is loaded at predetermined intervals, is connected with a central office by means of the toll entrance cable 10. As pointed out hereinbefore, with a 7.88 mile spacing of the loading coils upon the open-wire circuit, it is necessary to space the loading coils upon the toll entrance cable, usually having a capacity of .062 mf. per mile, at approximately 5,200 feet apart in order to obtain a nominal impedance and a cut-off frequency equal to that of the loaded open-wire circuit. It is customary at present to load toll cable circuits with a spacing of 6,000 feet between loading points. It will therefore be obvious that if in the loading of the toll entrance cable 10 of Fig. 1 it is practicable to place the first loading coil in the manhole 5, the remaining loading points 11, 12 and 13 upon this cable, which are spaced apart a distance $y$, equal to 5,200 feet, will not occur at the same manholes in which are placed the coils upon the toll underground cable 1. If an irregularity at the junction of the two circuits is to be avoided, this necessitates the building of extra fixtures or manholes for the proper housing of the entrance cable loading coils 11, 12 and 13, and it also increases the cost of installation of such cables because extra work is required in the testing and splicing of cables.

My invention resides in a method of loading by which the coils may be so spaced on the toll entrance cable as to coincide in location with the coils upon the underground toll cable, and at the same time to match the impedance of the open-wire circuit to be carried into the central office through the toll entrance cable.

The invention will be apparent from the consideration of Fig. 4 which shows the characteristic impedances of non-dissipative lines having mid-coil termination. The assumption that the lines are non-dissipative simplifies the description of the invention. It should be noted that non-dissipative lump loaded lines have zero reactance when terminated at mid-coil; namely, the characteristic impedance is a pure resistance varying with frequency as illustrated in Fig. 4. Actual lines, of course, are dissipative and consequently have small reactive components, particularly at the low frequencies, and also the resistance component is slightly larger at low frequencies. These effects are not of much practical importance with loaded circuits and may be reduced to a minimum by choosing the proper value of conductor resistance.

Curve A of Fig. 4 shows the mid-coil characteristic impedance of a 104-mil copper open-wire circuit loaded at a 7.88 mile spacing with coils having an inductance of .150 henry. Curves B and D show the characteristic (mid-coil) impedances of ordinary loadings in the entrance cable when the cable has the correct nominal impedance on 6,000-foot and 3,000-foot spacings, respectively. In the former case, the entrance cable has a cut-off frequency lower than that of the open-wire which is undesirable from the standpoints of transmission intelligibility and impedance irregularity; in the latter case, a large impedance irregularity would result. Curve C is for the case of ordinary coil loading designed to have the correct critical frequency with a 6,000-foot spacing. By means of the compound loading illustrated by Fig. 2, in which heavy-weight and light-weight coils occur alternately at uniform spacing and in which half heavy-weight coil termination is used, the cable can be given closely the desired characteristic impedance. Curve E (dotted) shows the characteristic impedance of such compound loading on a 3,000-foot spacing, which impedance substantially matches that of the open-wire loading, which is shown by curve A. The theory upon which the compound loading is based is as follows:

Compound loading may be considered as consisting of ordinary loading in which the heavy-weight coils designed to give the desired critical frequency, and the additional lighter weight coils, inserted at the center of each loading section, raise the nominal impedance to the desired value. This method of considering the loading is very closely correct when the light-weight coils have inductance values not greater than about 40 per cent of the heavy weight coils. At this point it is convenient to note that the light-weight coils which are required in compound loading systems of this type have relatively low inductance values and it is, therefore, practicable to construct them in small sizes. Since ordinarily only a small number of loaded lines are associated with any particular entrance cable, it should in general be practicable to house the light-weight coils in small pots which can be installed in ordinary cable manholes or splicing boxes.

The characteristic impedance of compound loading at mid-heavy weight coil (hereafter referred to as mid-coil characteristic impedance) is given by:

$$K_m^2 = k^2 \frac{1 + \frac{Z_1}{2k} \tanh y\, s}{1 + \frac{Z_2}{2k} \tanh y\, s} \left\{ 1 + \frac{Z_1 Z_2}{4k^2} + \frac{Z_1 + Z_2}{2k} \coth y\, s \right\} \quad (1)$$

where $K_m$ = mid-coil characteristic impedance of compound loaded line.

$k$ = characteristic impedance of non-loaded line.

$y$ = propagation constant of non-loaded line.

$2s$ = distance between heavy-weight coils.

$Z_1$ = series impedance of heavy-weight coil.

$Z_2$ = series impedance of light-weight coil.

In order to derive the design equations and to show clearly the results obtainable with compound loading, let it be assumed that the loading is applied to a non-dissipative line having no distributed inductance. Also assume the loading coils to be non-dissipative. Equation (1) then reduces to:

$$K_m^2 = \frac{1 - 0.5P^2L_1Cs}{1 - 0.5P^2L_2Cs}\left\{\frac{L_1+L_2}{2Cs} - \frac{P^2L_1L_2}{4}\right\} \quad (2)$$

where $P = 2\pi f$.
$L_1$ = inductance of heavy-weight coil.
$L_2$ = inductance of light-weight coil.
$C$ = capacity of cable per unit length.

By noting that
$0.5p^2L_1Cs = (f/f_1)^2$ and letting $(f/f_1) = W_1$
$0.5p^2L_2Cs = (f/f_2)^2$ and letting $(f/f_2) = W_2$
where $f_1$ is the critical frequency of the line with the light-weight coils omitted and $f_2$ is the critical frequency of the line with the heavy-weight coils omitted, Equation (2) can be reduced to the following:

$$K_m^2 = \frac{L_1+L_2}{2sC}\left\{\frac{1-W_1^2}{1-W_2^2}\right\}\left\{1 - \frac{W_1^2W_2^2}{W_1^2+W_2^2}\right\} \quad (3)$$

To further simplify, let $L_2 = rL_1$.

Since the coils are equally spaced, the two critical frequencies $f_1$ and $f_2$ will be inversely proportional to the square root of the inductances or
$$(f_1/f_2)^2 = L_2/L_1 = r$$
and
$$(f_1/f_2)^2 = (f_1/f_2 f)^2 = (W_2/W_1)^2 = r \quad (4)$$
substituting in (3)
$W_2^2 = rW_1^2$ from (4), $$K_m = \sqrt{\frac{L_1+L_2}{2sC}}\sqrt{\frac{1-W_1^2}{1-rW_1^2}\cdot\frac{1+r-rW_1^2}{1+r}} \quad (5)$$

For values of $r$ between zero and about 0.4 and for values of $W_1$ less than unity, Equation (5), as will be shown below, is closely equal to $$K_m = \sqrt{\frac{L_1+L_2}{2sC}}\sqrt{1-W_1^2} = \sqrt{\frac{L_1+L_2}{2sC}}\sqrt{1-\{f/f_1\}^2} \quad (6)$$

This equation represents the impedance of a line at mid-coil termination having a nominal impedance determined by the sum of the inductances of both coils and a critical frequency determined by the heavy-weight coil alone.

Let $f_0$ and $g_0$ equal the critical frequency and nominal impedance of the line whose mid-coil characteristic impedance $Z_0$ is to be matched. But
$$Z_0 = g_0\sqrt{1-(f/f_0)^2} \quad (7)$$
Equating Equations (6) and (7)
$$g_0\sqrt{1-(f/f_0)^2} = \sqrt{\frac{L_1+L_2}{2sC}}\sqrt{1-(f/f_1)^2} \quad (8)$$
or $L_1+L_2 = 2sCg_0^2$ and $f_1 = f_0$.
But
$$f_1 = \frac{1}{\pi\sqrt{L_1 2sC}} = f_0$$
so
$$L_1 = \frac{1}{2sC\pi^2 f_0^2} \quad (9)$$
and
$$L_2 = 2sCg_0^2 - L_1 \quad (10)$$

Equations (8) and (9) specify the inductance values of the coils required in compound loading for obtaining the desired impedance characteristics. The practical statement of the design method is as follows:

1. Design the heavy-weight coil to give the line the correct critical frequency with the light-weight coil omitted.
2. The light-weight coil should have enough inductance to bring the line up to the correct nominal impedance.

To illustrate the design method the design is worked out below, of compound loading to match the characteristic impedance of 104-mil open-wire circuits loaded with coils of .150 heavy inductance at a spacing of 7.88 miles. From curve A, Fig. 4, it will be noted that the nominal impedance ($g_0$) and critical frequency ($f_0$) of the loaded open-wire line are respectively, 1630 ohms and 3070 cycles. The desired spacing between adjacent coils in the cable is 3,000 feet; the cable capacity is .062 mf. per mile. The design data are then as follows:

| Open wire | Cable |
|---|---|
| $g_0 = 1630$ | $s = 3000/5280 = .568$ mi. |
| $f_0 = 3070$ | $C = .062$ mf. per mile |

From (8) $L_1+L_2 = 2sCg_0^2 = .187$ henry

From (9) $L_1 = \dfrac{1}{2sC\pi^2 f_0^2} = .153$ henry

Therefore, $L_2 = .034$ henry.

To determine the departure from the desired impedance of the actual impedance obtained with compound loading when the loading is designed as described above, it will be noted from Equations (5), (6) and (7) that the actual impedance of the compound loading at half-heavy coil termination is too large by the factor $$F = \sqrt{\frac{(1+r) - rW_1^2}{(1+r)(1-rW_1^2)}} \quad (11)$$

where $r$ is the ratio of the inductance of the light-weight coil to that of the heavy-weight coil. Fig. 5 shows the value of this function for various values of $r$ and $W_1$. It will be noted by reference to the curves that in the specific case under consideration, for which $r$ is approximately .2, the maximum value of the correction factor is about 2 per cent. The departure of the impedance from the ideal value becomes greater as the ratio of the inductance of the light-weight coil to that of the heavy-weight coil increases.

The impedance of compound loading at mid-light weight coil can be found from Equation (7) by interchanging $Z_1$ and $Z_2$. If the equation is then simplified as for half-heavy coil termination, it will be found that the characteristic impedance is $$K = \sqrt{\frac{L_1 + L_2}{2sC}} \sqrt{\frac{(1 + r - rW_1^2)(1 - rW_1^2)}{(1 + r)(1 - W_1^2)}} \quad (12)$$

which is equal to the mid-section characteristic impedance of regular type loading (having the same cut-off frequency and nominal impedance) multiplied by the factor $$F^1 = \sqrt{\frac{(1 + r - rW_1^2)(1 - rW_1^2)}{1 + r}} \quad (13)$$

It will be found that this factor, for given values of $r$ and $W_1$, is considerably larger than the factor applying to the half-heavy coil termination. Half-section termination of regular type loading can, therefore, be simulated by compound loading using half-light weight coil termination for only small values of $r$ or $W_1$.

In case it should be desired to use compound loading and at the same time obtain a characteristic impedance equal to that of half-section termination of regular loading other than half-coil (or any other termination); the method described below will permit its accomplishment.

Fig. 6 shows a compound loading system terminated at mid-heavy coil. As mentioned on page 1, it is possible to design a simple loading system which will have the same nominal impedance and critical frequency as the loaded open-wire line and, therefore, as the compound loading system which matches the loaded open-wire line. As also mentioned on page 1, in order to do this, it is necessary that the loading coils used on the simple system have the correct inductance values and be spaced at intervals of 5200 feet. Fig. 7 shows a simple system of this type terminated in mid-coil.

Since the nominal impedances and critical frequencies are the same, the compound system may be joined to the simple system without introducing an impedance irregularity at the junction. This may be understood by reference to Figs. 6, 7 and 8. Fig. 6 represents a compound system terminated in mid-heavy coil at A. Fig. 7 represents a simple system as described above, terminated at mid-coil at $B^1$. As explained above, these two systems may be joined together ( by connecting $B^1$ of Fig. 7 to A of Fig. 6) without irregularity. However, if the purpose of joining the lines is only to obtain a termination other than mid-coil, this may be accomplished by connecting a part of a loading section of the line having simple loading to the line with compound loading. $BB^1$ of Fig. 7 represents this condition and in Fig. 8 it is shown joined to the compound loaded circuit of Fig. 6. Obviously, the two half-weight inductance coils $L^1/2$ and $L_1/2$ can be obtained by one physical coil having an inductance of $(L_1 + L^1)/2$.

The section $BB^1$ may be either a part of a real line or a condenser of the proper capacity depending on where it is desired to locate the first loading coil.

The arrangements shown in Figs. 9 and 10 are alternative schemes involving the broad principle underlying the system shown in Figs. 2 and 3. In the arrangement shown, for example, in Fig. 2, the cut-off frequency is determined by the inductance value and the spacing (reckoned on a capacity basis) of the coils having the higher of two regular inductance values. When the cut-off frequency of the cable circuit is thus made the same as that of the open-wire circuit, the impedance of the cable circuit is then brought up to that of the open-wire circuit by the lighter weight coils spaced along the cable midway between the coils of higher inductance.

In the arrangement shown in Fig. 9, which employs coils of equal inductance value, the cut-off frequency is determined by the longer of the two regular spacing intervals (reckoned on a capacity basis) and upon the nominal inductance value of the regular loading coils. The shorter of the two regular spacing intervals does not affect the cut-off frequency except within certain limitations which are analogous to the effect produced by the lower inductance coil shown in Fig. 2 and described hereinbefore. The nominal impedance of the cable circuit is determined by the inductance and capacity characteristics of the unit loaded cable structure which repeats itself, that is to say, it is a function of the ratio of the sum of the inductance values of two adjacent loading coils to the total capacity of adjacent long and short loading sections. Accordingly, an entrance cable loaded as shown in Fig. 9 would need to have the following characteristics: First, the nominal single loading inductance value of the system shown in Fig. 9 would be approximately one-half of the sum of the two different regular coil values shown in the system of Fig. 2; and second, the sum of the capacity values of any two adjacent regular loading sections of the systems shown in Fig. 9 would be twice the capacity value of the regular loading sections shown in Fig. 2.

The arrangement shown in Fig. 10 involves ideas taken from both Figs. 2 and 9. In the system of Fig. 10 the cut-off frequency is a function both of the loading inductance values and the capacity of both cable sections intervening between any two adjacent high inductance coils. The nominal impedance is a function of the sum of the inductance values of any two adjacent loading sections and the sum of the capacity values. This means that in the arrangement shown in Fig. 10 having the general characteristics jusct set forth, it is not necessary to have the light-weight inductance coils spaced half-way (on a capacity basis) between adjacent heavy weight coils.

This may be of some practical value where conditions are such as to render it desirable to avoid the necessity for placing the light-weight coils at the mid-point of a section of cable between two heavy-weight coils. While the systems shown in Figs. 9 and 10 embody the same underlying principles as the system shown in Figs. 2 and 3, it has been deemed desirable to more fully describe the system shown in the latter figure, inasmuch as that system seems to be of greater practical importance than the others.

While this invention has been disclosed as embodied in a particular form and arrangement of parts, it is to be understood that it is capable of embodiment in other and different forms without departing from the spirit and scope of the appended claims.

What is claimed is:

1. A system of compound loading comprising heavy-weight and light-weight inductance coils alternately spaced, the cut-off frequency of the loading system being determined by the inductance and spacing of the heavy-weight coil, and the characteristic impedance of the system being determined by the value of both coils combined.

2. A system of compound loading having heavy-weight and light-weight loading coils located at alternate loading points in the same circuit, the said coils being so connected that the total line current flows through all of them.

3. The combination with a simple loaded circuit of a compound loaded circuit, both of said circuits having the same cut-off frequency and the same impedance.

4. A system comprising two loaded circuits connected without impedance irregularity, one of said circuits being loaded by a plurality of similar coils equally spaced, and the other by a plurality of coils of two different inductance values which are alternately connected with the said circuit, the coils of higher value rendering the cut-off frequency of the said other circuit equal to that of the first, and the coils of lower value rendering the impedance of the other circuit equal to that of the first.

5. In an electrical transmission system, the combination with a line having uniformly distributed capacity of a plurality of loading coils connected therewith and spaced at equal distances apart, the adjacent coils having different inductance values and every second coil having the same inductance value, the coils being so connected with the said line that the total line current flows through all of them.

6. In an electrical transmission system, the combination with a line having uniformly distributed capacity of a plurality of loading coils constituting two loading groups, the coils of one group being connected with said line midway between the points of connection of the coils of the other group, all coils of each group having the same inductance value, the values being different for the several groups, the coils being so connected with the said line that the total line current flows through all of them.

In testimony whereof, I have signed my name to this specification this 11th day of November, 1925.

NORMAN R. FRENCH.